(12) United States Patent
Mitchell

(10) Patent No.: US 11,448,890 B1
(45) Date of Patent: Sep. 20, 2022

(54) COMMON APERTURE OPTICAL SYSTEM AND SELECTIVE IMAGING METHOD

(71) Applicant: Wavefront Research Inc., Northampton, PA (US)

(72) Inventor: Thomas A. Mitchell, Nazareth, PA (US)

(73) Assignee: Wavefront Research, Inc., Northhampton, PA (US)

( * ) Notice: Subject to any disclaimer, the term of this patent is extended or adjusted under 35 U.S.C. 154(b) by 26 days.

(21) Appl. No.: 17/086,042

(22) Filed: Oct. 30, 2020

Related U.S. Application Data

(63) Continuation of application No. 16/199,459, filed on Nov. 26, 2018, now Pat. No. 10,823,974, which is a continuation of application No. 14/213,155, filed on Mar. 14, 2014, now Pat. No. 10,139,638.

(60) Provisional application No. 61/793,310, filed on Mar. 15, 2013.

(51) Int. Cl.
| | |
|---|---|
| *G02B 27/14* | (2006.01) |
| *G01J 1/04* | (2006.01) |
| *G02B 27/28* | (2006.01) |
| *G02B 27/10* | (2006.01) |

(52) U.S. Cl.
CPC .......... *G02B 27/149* (2013.01); *G01J 1/0414* (2013.01); *G02B 27/1013* (2013.01); *G02B 27/141* (2013.01); *G02B 27/283* (2013.01)

(58) Field of Classification Search
CPC .............. G02B 27/149; G02B 27/1013; G02B 27/141; G02B 27/283; G01J 1/0414
See application file for complete search history.

(56) References Cited

U.S. PATENT DOCUMENTS

| | | | |
|---|---|---|---|
| 6,147,802 A | 11/2000 | Itoh et al. | |
| 6,282,028 B1 | 8/2001 | Waibel et al. | |
| 6,398,364 B1 | 6/2002 | Bryars | |
| 7,926,949 B1 | 4/2011 | Boothroyd | |
| 2006/0028620 A1 | 2/2006 | Conner | |
| 2007/0064417 A1 | 3/2007 | Hatanaka | |
| 2007/0159634 A1 | 7/2007 | Englert | |
| 2010/0328780 A1 | 12/2010 | Tocci | |
| 2014/0125985 A1 | 5/2014 | Justice et al. | |
| 2014/0253849 A1* | 9/2014 | Poon .................... | G02B 27/145 349/97 |

* cited by examiner

*Primary Examiner* — Georgia Y Epps
*Assistant Examiner* — Don J Williams
(74) *Attorney, Agent, or Firm* — Culhane Meadows PLLC; Orlando Lopez

(57) ABSTRACT

The present disclosure provides an optical system. In one aspect, the optical system includes a plurality of imagers configured to emit an electromagnetic radiation, a plurality of optical sensors configured to receive the electromagnetic radiation from the imagers, and a beam splitting device disposed at an optical path between the imagers and the optical sensors. In one example, the beam splitting device is a multi-way beam splitter configured to receive the electromagnetic radiation from one of the imagers and separate the received electromagnetic radiation into a plurality of portions, each separated portion of the received electromagnetic radiation being directed to one of the optical sensors.

2 Claims, 9 Drawing Sheets

COMMON APERTURE OPTICAL SYSTEM AND SELECTIVE IMAGING METHOD

CROSS-REFERENCE TO RELATED APPLICATIONS

This application is a continuation of U.S. patent application Ser. No. 16/199,459, entitled COMMON APERTURE OPTICAL SYSTEM AND SELECTIVE IMAGING METHOD, filed Nov. 26, 2018, which is a continuation of U.S. patent application Ser. No. 14/213,155, entitled COMMON APERTURE OPTICAL SYSTEM AND SELECTIVE IMAGING METHOD, filed Mar. 14, 2014, which claims priority to U.S. Provisional Application No. 61/793,310, filed on Mar. 15, 2013, the entire contents of both of which are incorporated herein by reference and for all purposes.

BACKGROUND

The present teachings relate generally to common aperture optical systems and selective imaging methods. More particularly, the present teachings relate to common aperture optical systems that have two or more common imagers and can readily switch between the common imagers, and selective imaging methods.

In many cases, such as but not limited to, large aperture imaging systems, it is advantageous to share the primary imager between multiple sensors to provide a more compact system design or simplified co-registration between the two optical systems. However, there is often a desire or a need to provide multiple inputs to these optical systems, whereby more than one common aperture imager or device is coupled to the optical systems as needed. It is further desirable that this capability be easily implemented and not require the physical removal of one common aperture imager to be replaced by another.

SUMMARY

The various embodiments of the present teachings provide the capability to readily switch between one common imager and another as the source imager in a common aperture optical system.

For a better understanding of the present invention, together with other and further objects thereof, reference is made to the accompanying drawings and detailed description.

DETAILED DESCRIPTION

Figure 1:
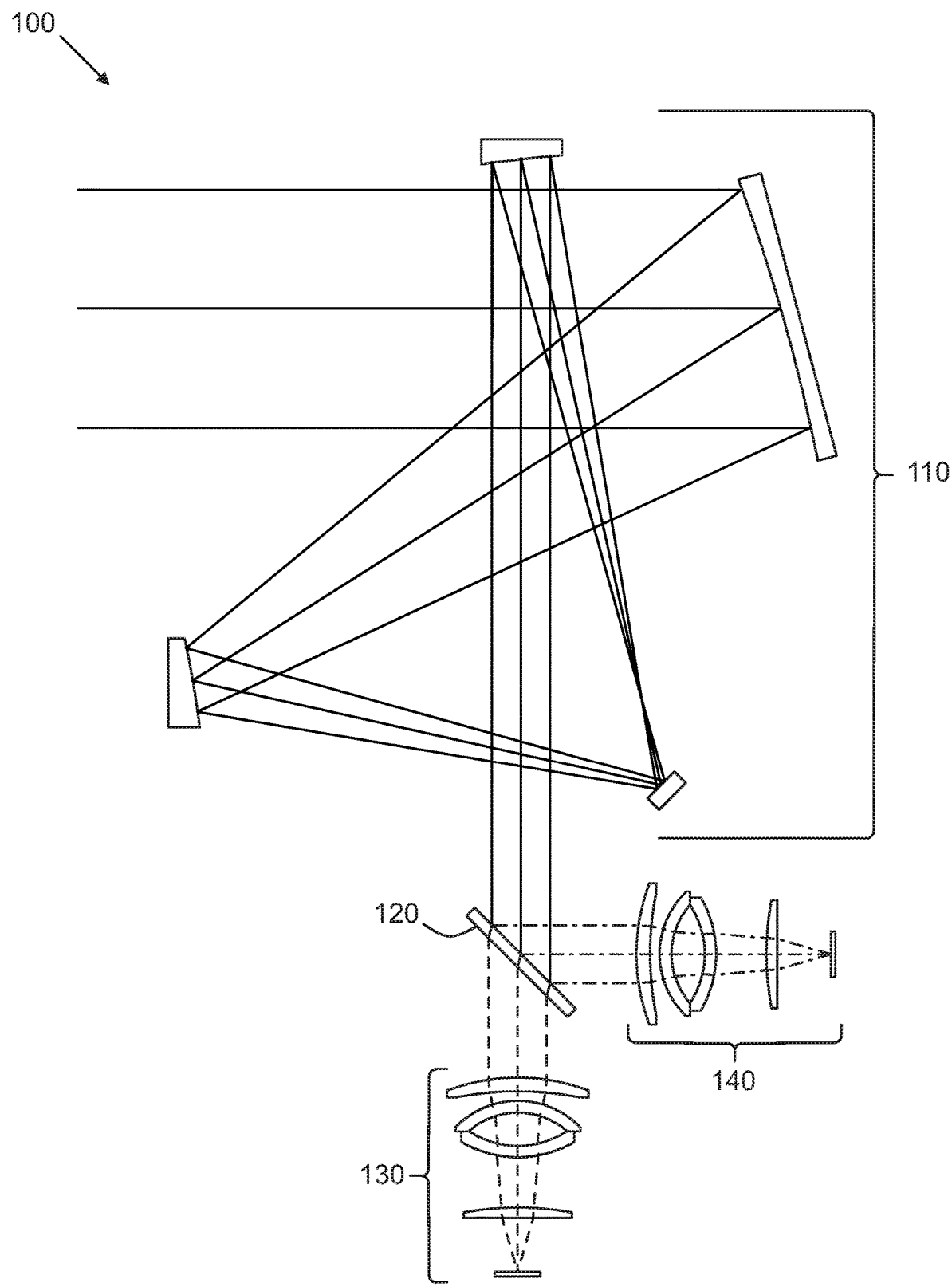
FIG. 1 is a schematic view of a common aperture optical system.

Reference is made to FIG. 1, which is a schematic view of a common aperture optical system 100. Electromagnetic radiation (typically in the ultraviolet, visible, and/or infrared bands, hereinafter referred to generally as "light") emitted or reflected by a given object (either real or virtual, hereinafter referred to generally as "source") located at the object plane is incident on an imager 110, which substantially transmits the light to a light splitting component 120 that separates the light from imager 110 by spectral band, polarization, split throughput, or other means of division (such as, but not limited to, a beam splitter, hereinafter referred to generally as "beam splitter"). The separated light is then incident upon a plurality of optical systems 130 and 140.

In many cases, such as but not limited to, large aperture imaging systems, it is advantageous to share the primary imager between multiple sensors to provide a more compact system design or simplified co-registration between the two optical systems. However, there is often a desire or a need to provide multiple inputs to these optical systems, whereby more than one common aperture imager or device is coupled to the optical systems as needed. It is further desirable that this capability be easily implemented and not require the physical removal of one common aperture imager to be replaced by another. The dual common aperture optical systems of the present teachings provide this capability in a compact design form.

Figure 2A:
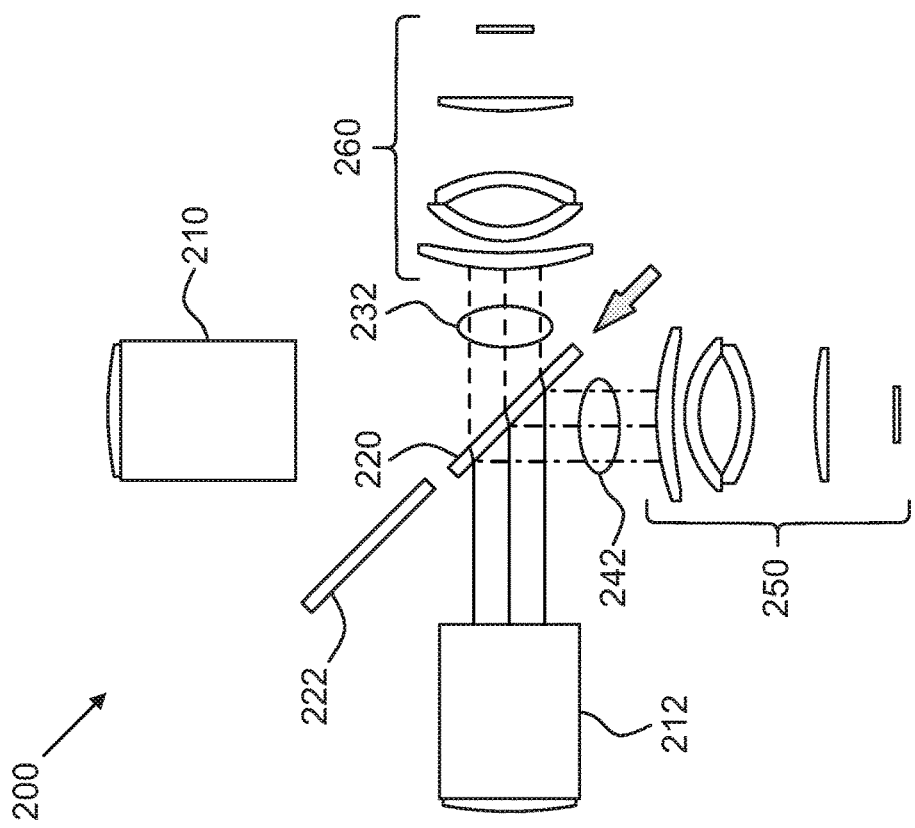
FIGS. 2A-2D are schematic views of an optical imaging system in accordance with an embodiment of the present teachings.
Figure 2B:
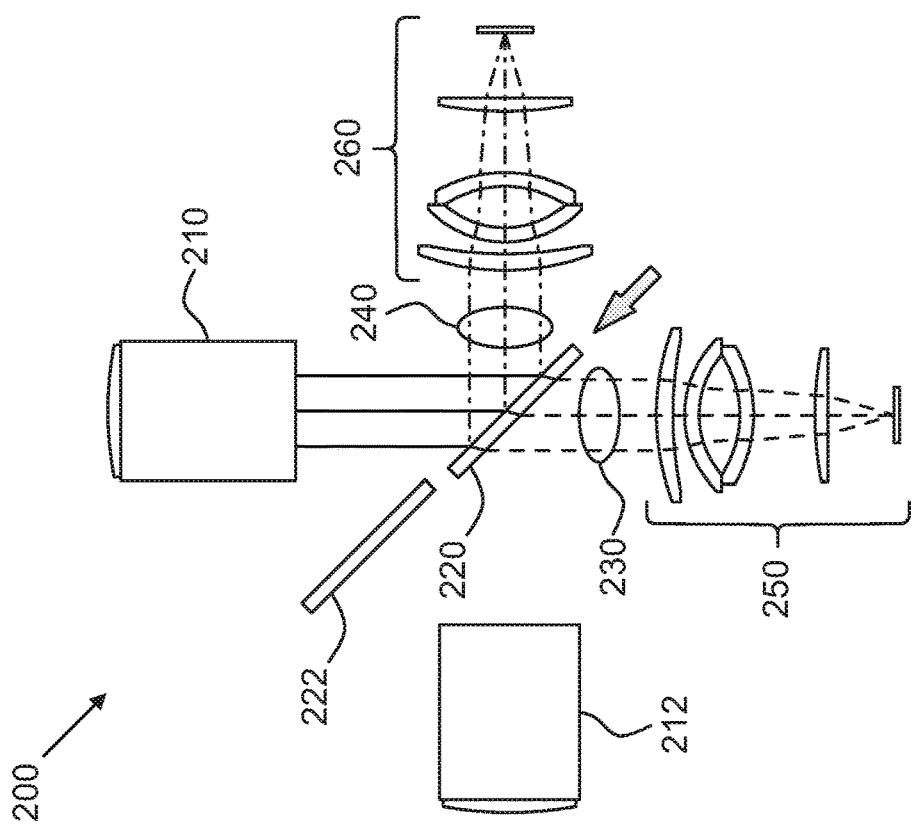

Reference is made to FIGS. 2A-2D, which illustrate schematic views of an optical imaging system 200 in accordance with an embodiment of the present teachings. Referring to FIGS. 2A and 2B, in one embodiment, light directed by a first imager 210 is incident upon a first beam splitter 220, which is capable of substantially separating a first portion of the light 230 from a second portion of the light 240, by means of, for example, substantially transmitting the first portion of light 230 and substantially reflecting the second portion of light 240, as illustrated in the schematic view of FIG. 2A. The first portion of light 230 is incident on a first optical system 250 (including a first sensor) that is capable of substantially receiving the first portion of light 230 from the first beam splitter and the second portion of light 240 is incident on a second optical system 260 (including a second sensor) that is capable of substantially receiving the second portion of light 240 from the first beam splitter 220.

A second imager 212 is located such that light directed by the second imager 212 is incident upon the first beam splitter 220, as illustrated in the schematic view of FIG. 2B, whereby a first portion of light 232 is substantially transmitted by the beam splitter 220 and substantially directed away from the first optical system 250, and a second portion of light 242 is substantially reflected by the beam splitter 220 and substantially directed away from the second optical system 260. In this configuration, as shown in FIGS. 2A and 2B, the first optical system 250 and the second optical system 260 substantially receive the first portion of light 230 and the second portion of light 240 respectively directed from the first imager 210, and are substantially blocked from or do not substantially receive the first portion of light 232 and the second portion of light 242 respectively directed by the second imager 212.

Figure 2D:
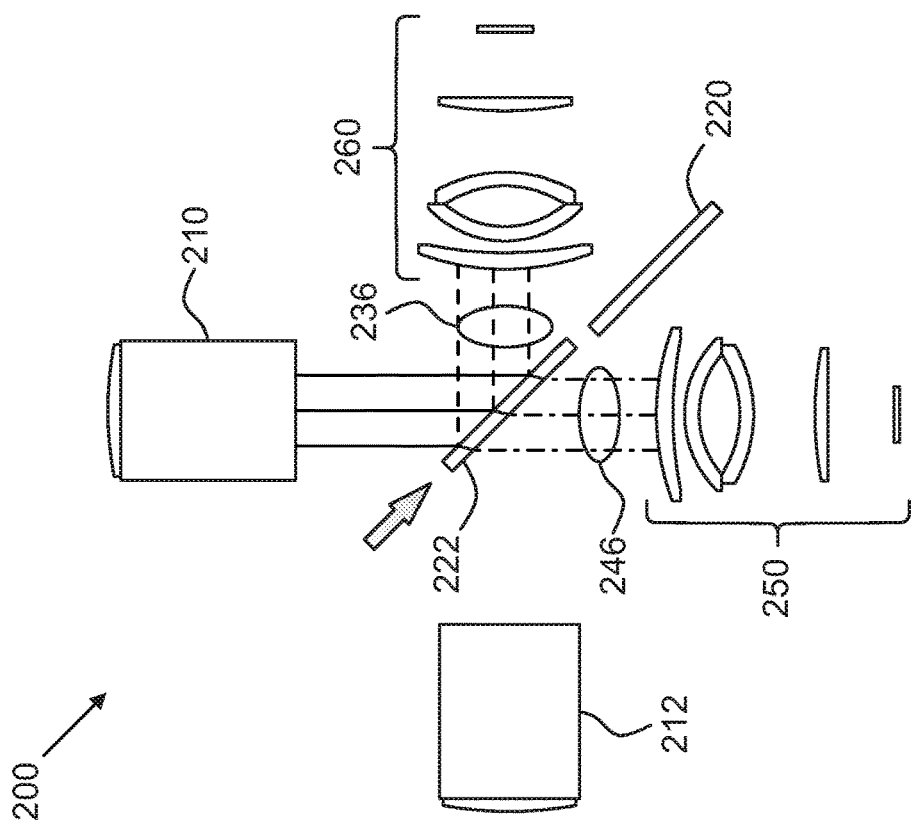
Figure 2C:
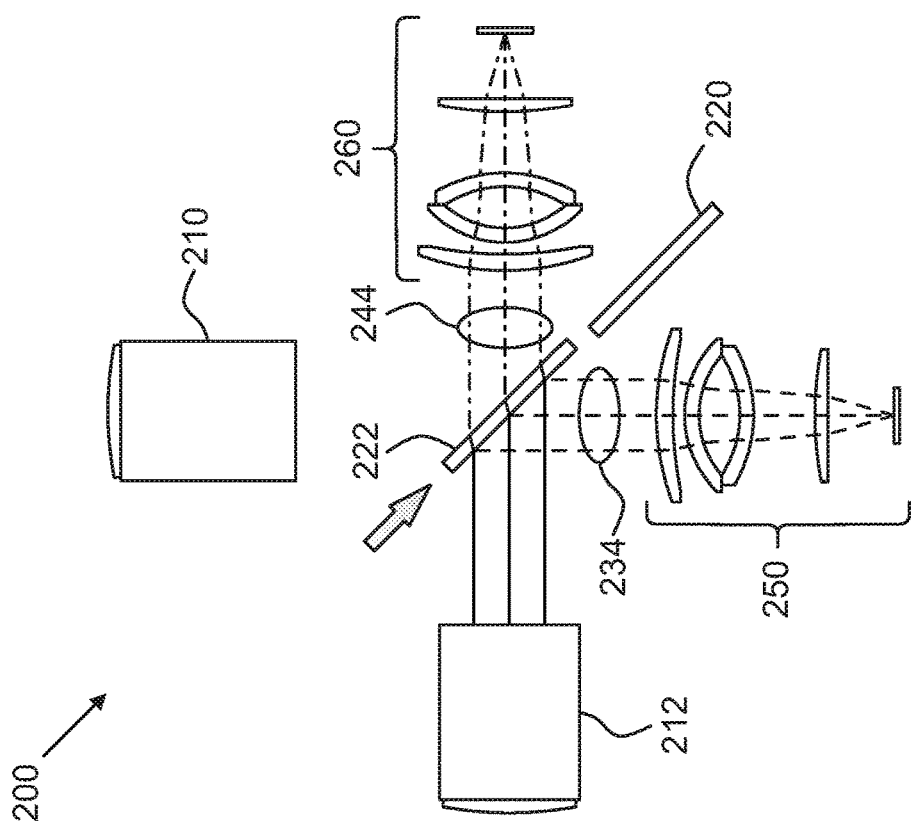

Referring to FIGS. 2C and 2D, in one embodiment, the first beam splitter 220 is capable of being moved out of the optical path of the first imager 210 and the second imager 212 such that a second beam splitter 222 can be located substantially in place of first beam splitter 220 by means of, for example, translation, rotation, tilting, etc.

Light directed by the second imager 212 is incident upon the second beam splitter 222 which is capable of substantially separating a first portion of light 234 from a second portion of light 244, by means of, for example, reflecting the first portion of light 234 and transmitting the second portion of light 244, as illustrated in the schematic view of FIG. 2C. The first portion of light 234 is incident on the first optical system 250 which is capable of substantially receiving the first portion of light 234 from the beam splitter 222. The second portion of light 244 is incident on the second optical system 260 which is capable of substantially receiving the second portion of light 244 from the beam splitter 222.

Light directed by the first imager 210 is incident upon the second beam splitter 222, as illustrated in the schematic view of FIG. 2D, whereby a first portion of light 236 is substantially reflected by the beam splitter 222 and substantially directed away from the first optical system 250, and a second portion of light 246 is substantially transmitted by the beam splitter 222 and substantially directed away from the second optical system 260. In this configuration, as shown in FIGS. 2C and 2D, the first optical system 250 and the second optical system 260 substantially receive the first portion of light 234 and the second portion of light 244 respectively directed from the second imager 212, and are substantially blocked from or do not substantially receive the first portion of light 236 and the second portion of light 246 respectively directed by the first imager 210.

Figure 3A:
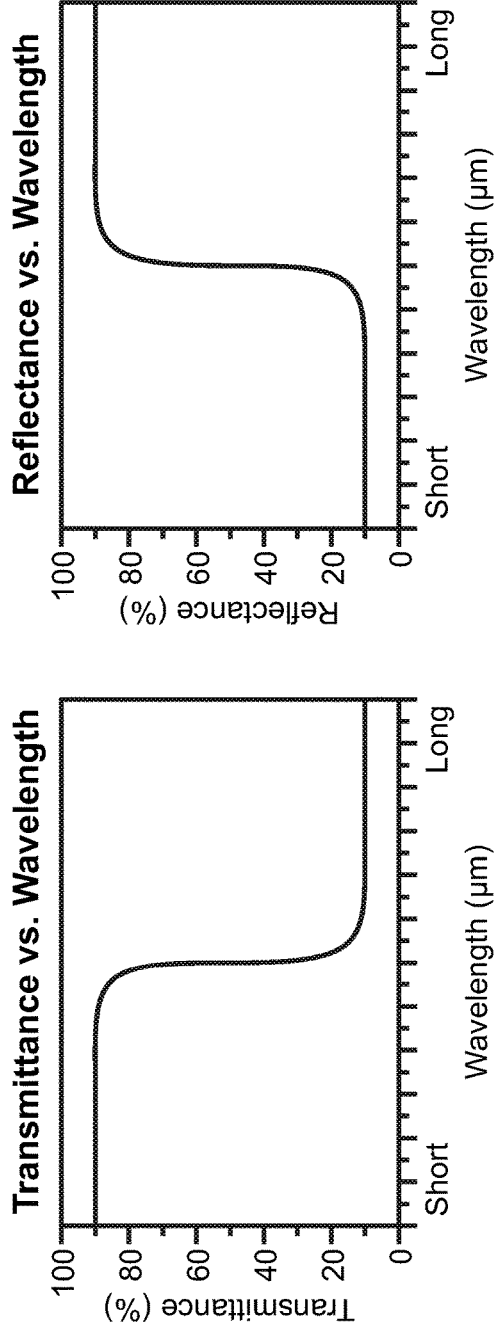
FIG. 3A illustrates the optical transmission and reflectance characteristics of a first beam splitter element of the optical imaging system shown in FIGS. 2A-2D, in accordance with an embodiment of the present teachings.
Figure 3B:
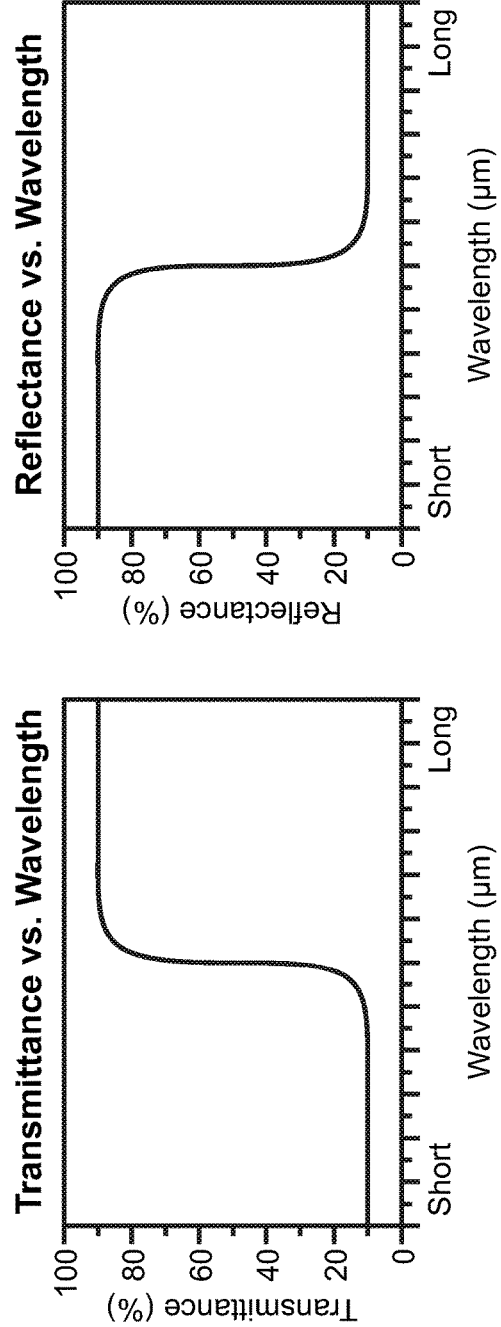
FIG. 3B illustrates the optical transmission and reflectance characteristics of a second beam splitter of the optical imaging system shown in FIGS. 2A-2D, in accordance with an embodiment of the present teachings.

In one embodiment, the first beam splitter element 220 of the optical imaging system 200 illustrated in FIG. 2A-2D comprises, for example, optical band pass coatings. As illustrated in the embodiment shown in FIG. 3A, the first beam splitter 220 substantially transmits the shorter wavelength portion of the light and reflects the longer wavelength portion of the light. In one embodiment, the second beam splitter element 222 of the optical imaging system 200 illustrated in FIG. 2A-2D comprises, for example, optical band pass coatings. As illustrated in FIG. 3B, the second beam splitter 222 can transmit the longer wavelength portion of the light and reflects the shorter wavelength portion of the light.

Figure 4A:
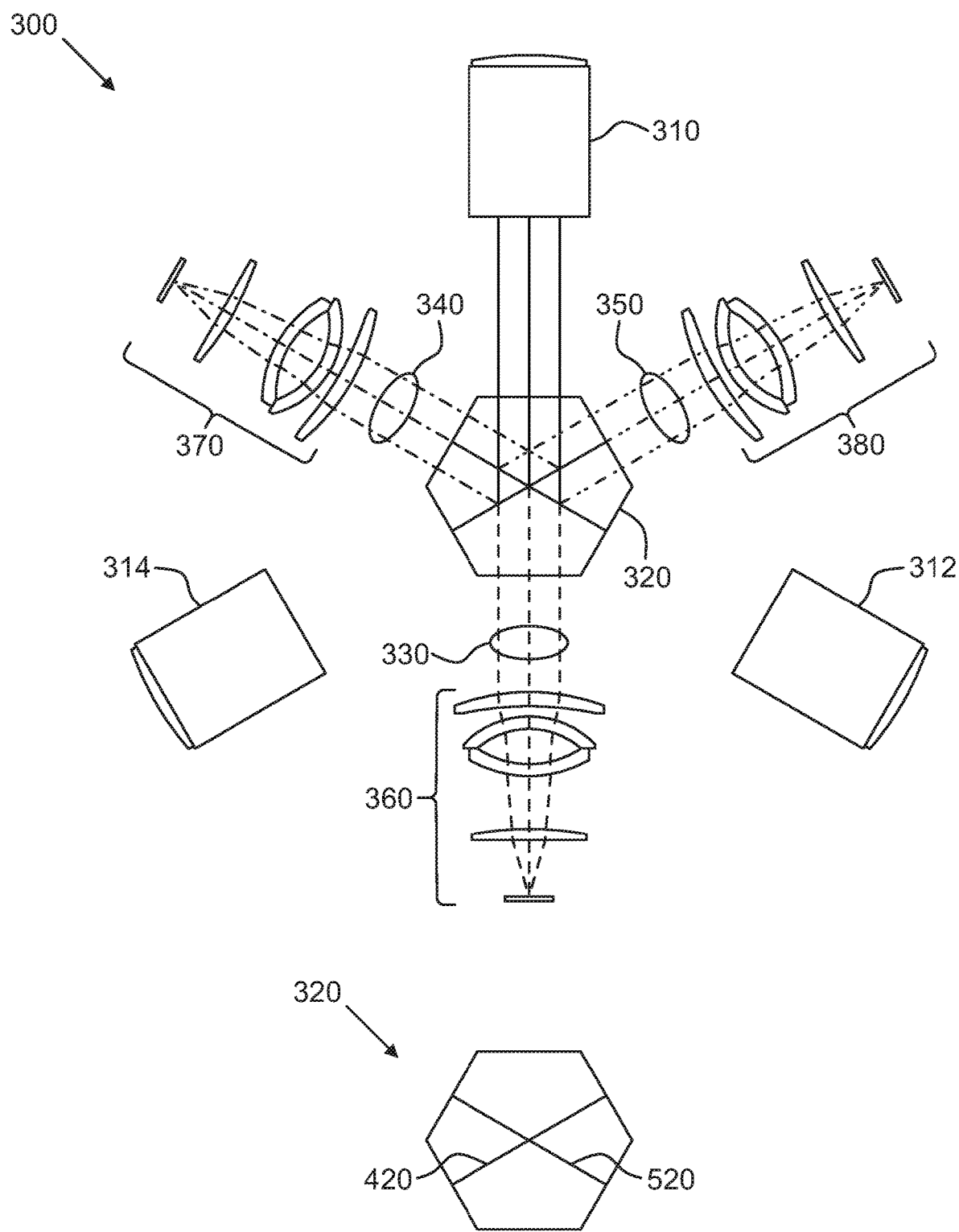
FIGS. 4A-4E are schematic view of an optical imaging system, in accordance with another embodiment of the present teachings.

Referring to FIGS. 4A-4E, there are illustrated schematic views of an optical imaging system 300, in accordance with another embodiment of the present teachings. Referring to FIG. 4A, in one embodiment, light directed by a first imager 310 is incident upon a first beam splitter 320 which is capable of separating a first portion of light 330, a second portion of light 340, and a third portion of light 350, by means of, for example, transmitting the first portion of light 330, reflecting the second portion of light 340 in a first direction, and reflecting the third portion of light 350 in a second direction, as illustrated in the schematic view of FIG. 4A. The first portion of light 330 is incident on a first optical system 360 (including a first sensor) that is capable of substantially receiving the first portion of light 330. The second portion of the light 340 is incident on a second optical system 370 (including a second sensor) that is capable of substantially receiving the second portion of light 340. The third portion of the light 350 is incident on a third optical system 380 (including a third sensor) that is capable of substantially receiving the third portion of light 350.

In one embodiment, the first beam splitter element 320 comprises an optically transparent material (such as glass, plastic, or other refractive material and the like) and has a hexagonal cross section and comprises a first optical band pass coating 420 and a second optical band pass coating 520, as illustrated in the same orientation in the lower portion of FIG. 4A. In this embodiment, the first optical band pass coating 420 substantially transmits the first portion of light 330, substantially reflects the second portion of light 340, and substantially transmits the third portion of light 350. In this embodiment, the second optical band pass coating 520 substantially transmits the first portion of light 330, substantially transmits the second portion of light 340, and substantially reflects the third portion of light 350. In one embodiment, first and second optical band pass coatings 420 and 520 form flat surfaces extending from a center point of one side of the hexagonal cross section to a center of an opposing side of the hexagonal cross section. In one embodiment, the flat surfaces cross with each other by an angle θ of about 60 degrees.

Figure 4B:
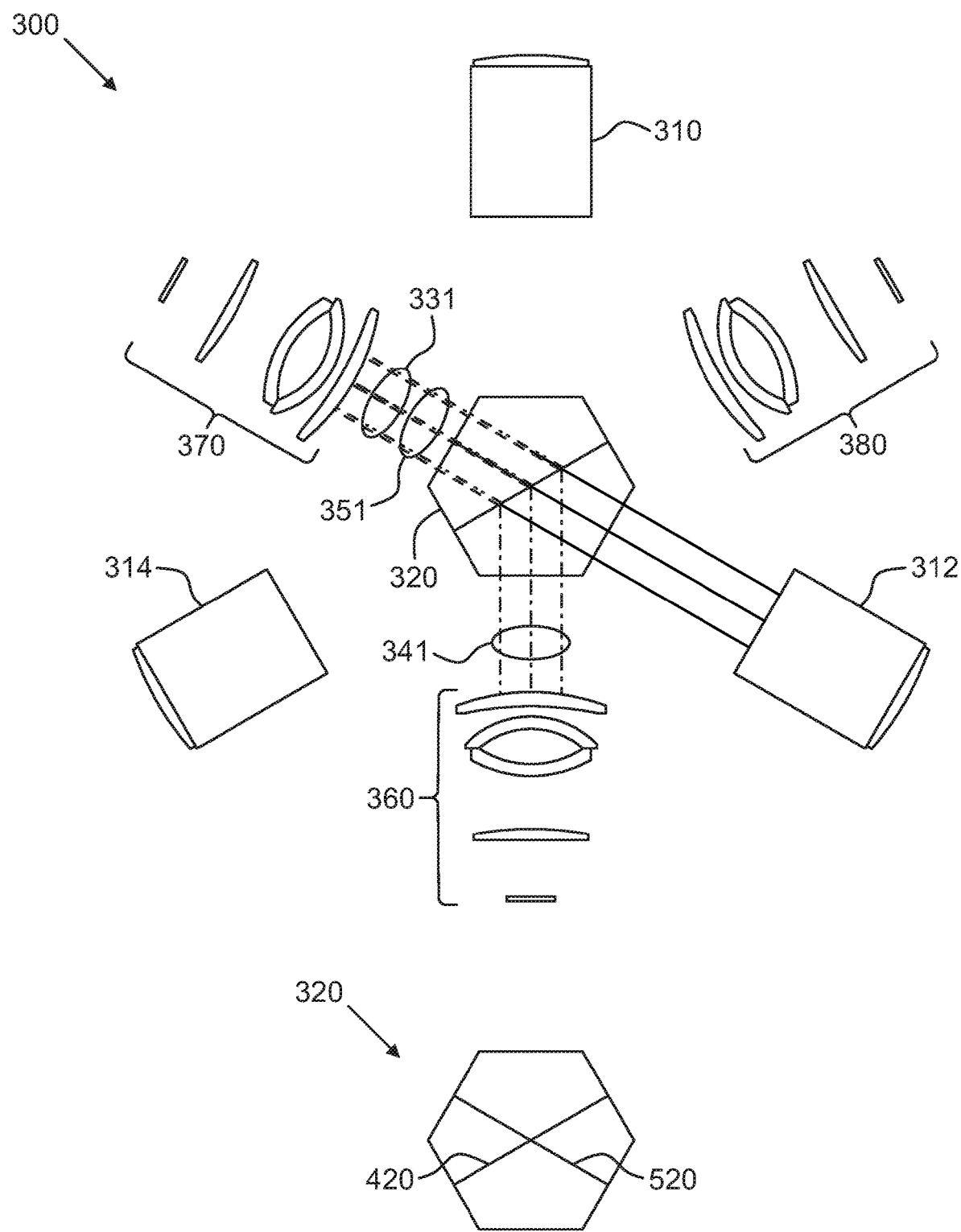

Referring to FIG. 4B, a second imager 312 is located such that light directed by the second imager 312 is incident upon the first beam splitter 320. A first portion of light 331 is substantially transmitted by the beam splitter 320 and substantially directed away from the first optical system 360. A second portion of the light 341 is substantially reflected by the beam splitter 320 and substantially directed away from the second optical system 370. A third portion of the light 351 is substantially transmitted by the beam splitter 320 and substantially directed away from the third optical system 380. In this configuration, as shown in FIGS. 4A and 4B, the first optical system 360, the second optical system 370, and the third optical system 380 substantially receive the first portion of light 330, the second portion of light 340, and the third portion of light 350 respectively directed from the first imager 310, and are substantially blocked from or do not substantially receive the first portion of light 331, the second portion of light 341, and the third portion of light 351 respectively of the light directed by the second imager 312.

Figure 4C:
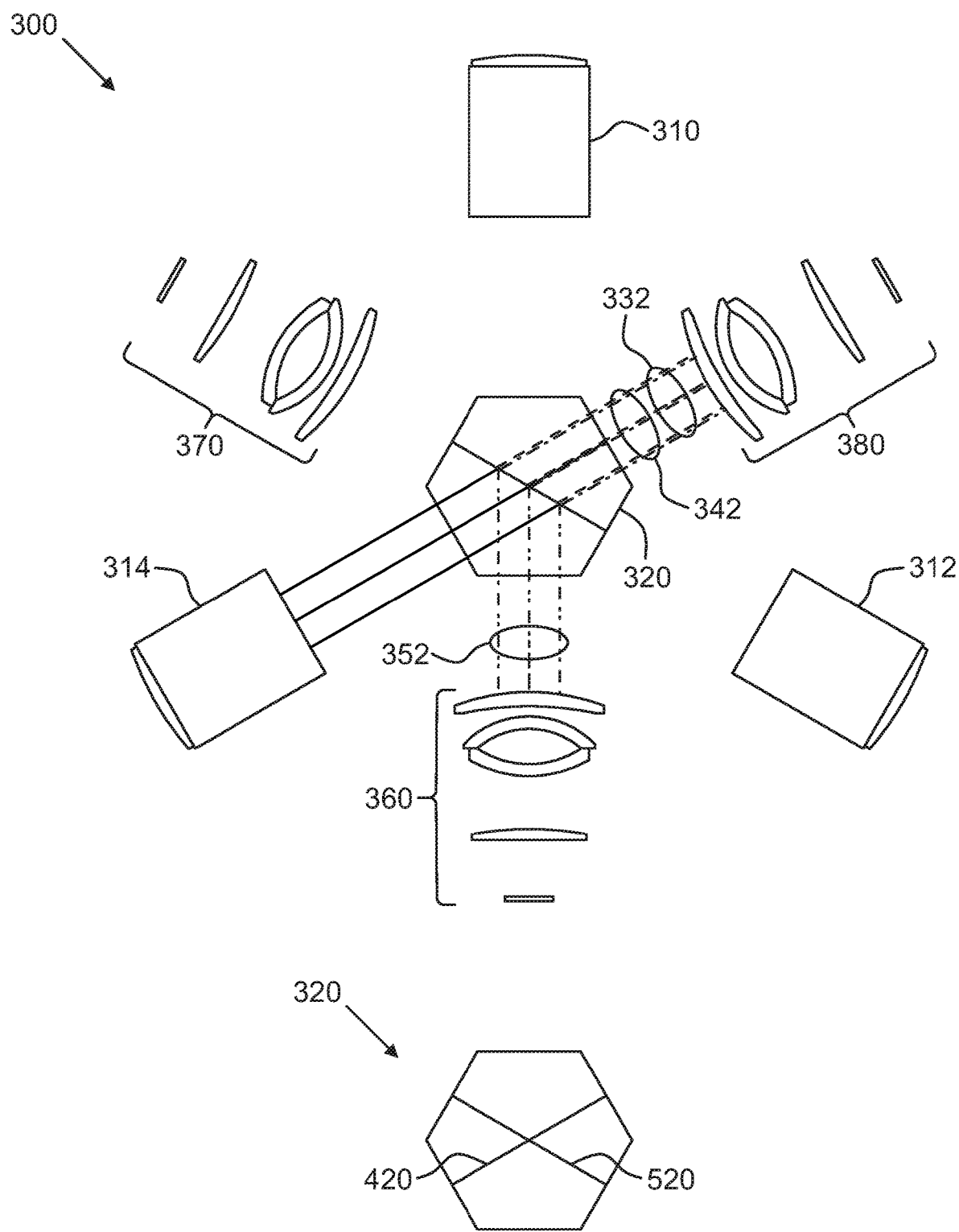

Referring to FIG. 4C, a third imager 314 is located such that light directed by the third imager 314 is incident upon the first beam splitter 320. A first portion of light 332 is substantially transmitted by the beam splitter 320 and substantially directed away from the first optical system 360. A second portion of light 342 is substantially transmitted by the beam splitter 320 and substantially directed away from the second optical system 370. A third portion of light 352 is substantially reflected by the beam splitter 320 and substantially directed away from the third optical system 380. In this configuration, as shown in FIGS. 4A-4C, the first optical system 360, the second optical system 370, and the third optical system 380 substantially receive the first portion of light 330, the second portion of light 340, and the third portion of light 350 respectively directed from the first imager 310, and are substantially blocked from or do not substantially receive the first portion of light 331, the second portion of light 341, and the third portion of light 351 respectively directed by the second imager 312, and are substantially blocked from or do not substantially receive the first portion of light 332, the second portion of light 342, and the third portion of light 352 respectively directed by the third imager 314.

Figure 4D:
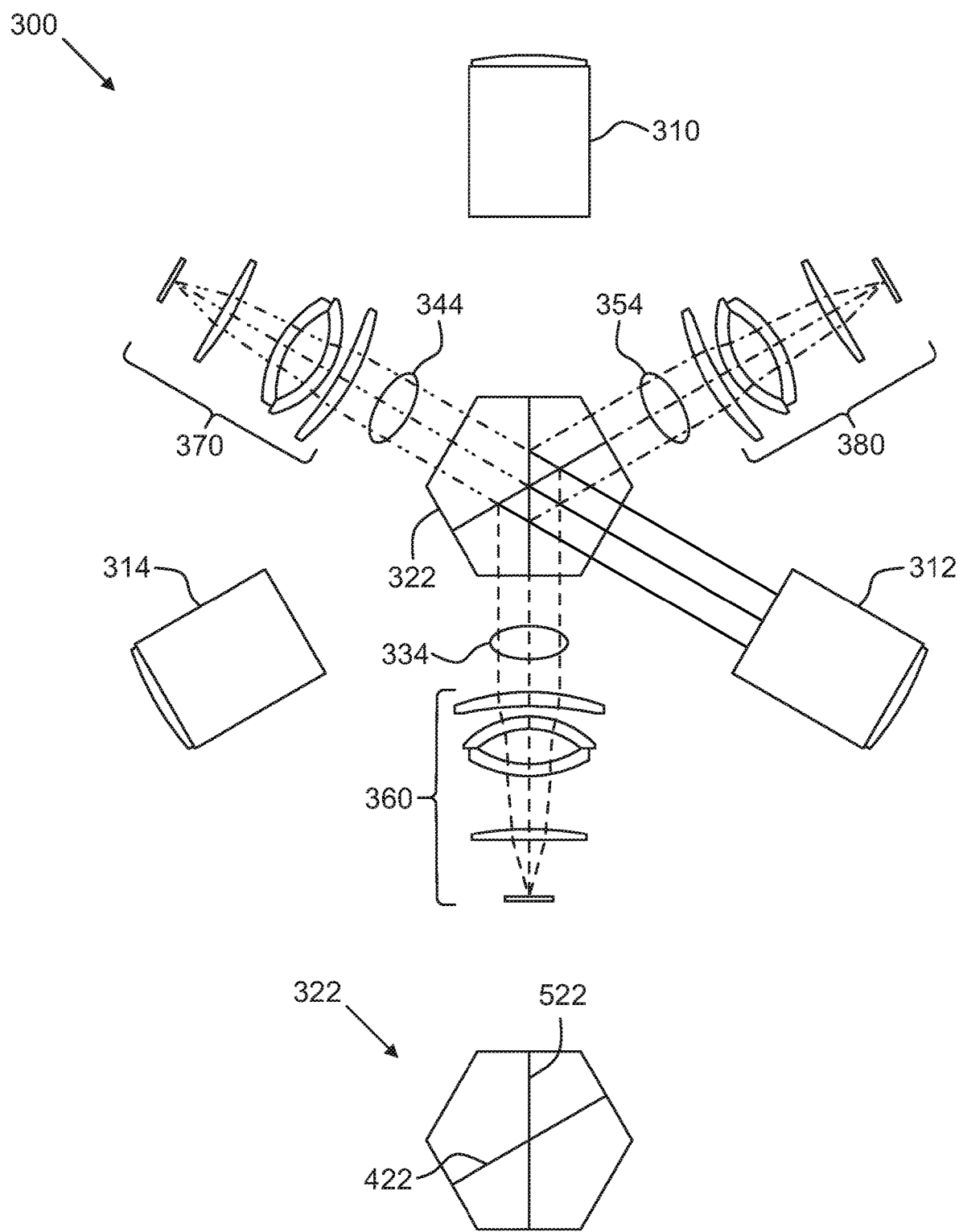

The first beam splitter 320 shown in FIG. 4A is capable of being moved out of the path of the first imager 310, the second imager 312, and the third imager 314, such that a second beam splitter 322 shown in FIG. 4D can be located substantially in place of first beam splitter 320 by means of, but not limited to, translation, rotation, tilting, etc.

Referring to FIG. 4D, in one embodiment, light directed by the second imager 312 is incident upon the second beam splitter 322 which is capable of substantially separating a first portion of light 334, a second portion of light 344, and a third portion of light 354, by means of, for example, transmitting the second portion of light 344, reflecting the first portion of light 334 in a first direction, and reflecting the third portion of light 354 in a second direction. The first portion of light 334 is incident on the first optical system 360, which is capable of substantially receiving the first portion of light 334. The second portion of light 344 is incident on the second optical system 370, which is capable of substantially receiving the second portion of light 344. The third portion of the light 354 is incident on the third optical system 380, which is capable of substantially receiving the third portion of the light 354.

Referring again to FIG. 4D, similar to the description provided with reference to FIGS. 4B and 4C, light directed by the first imager 310 and the third imager 314 are incident upon the second beam splitter 322, whereby the first portion of light from each is substantially directed away from the first optical system 360, the second portion of the light from each is substantially directed away from the second optical system 370, and the third portion of the light from each is substantially directed away from the third optical system 380. In this configuration, the first optical system 360, the second optical system 370, and the third optical system 380 substantially receive light directed from the second imager 312, and are substantially blocked from or do not substantially receive light directed by the first imager 310 and the third imager 314.

Referring still to FIG. 4D, in one embodiment, the second beam splitter element 322 comprises a first optical band pass coating 422 and a second optical band pass coating 522. In one embodiment, the first optical band pass coating 422 substantially reflects the first portion of light 334, substantially transmits the second portion of light 344, and substantially transmits the third portion of light 354. In one embodiment, the second optical band pass coating 522 substantially transmits the first portion of light 334, substantially transmits the second portion of light 344, and substantially reflects the third portion of light 354.

Figure 4E:
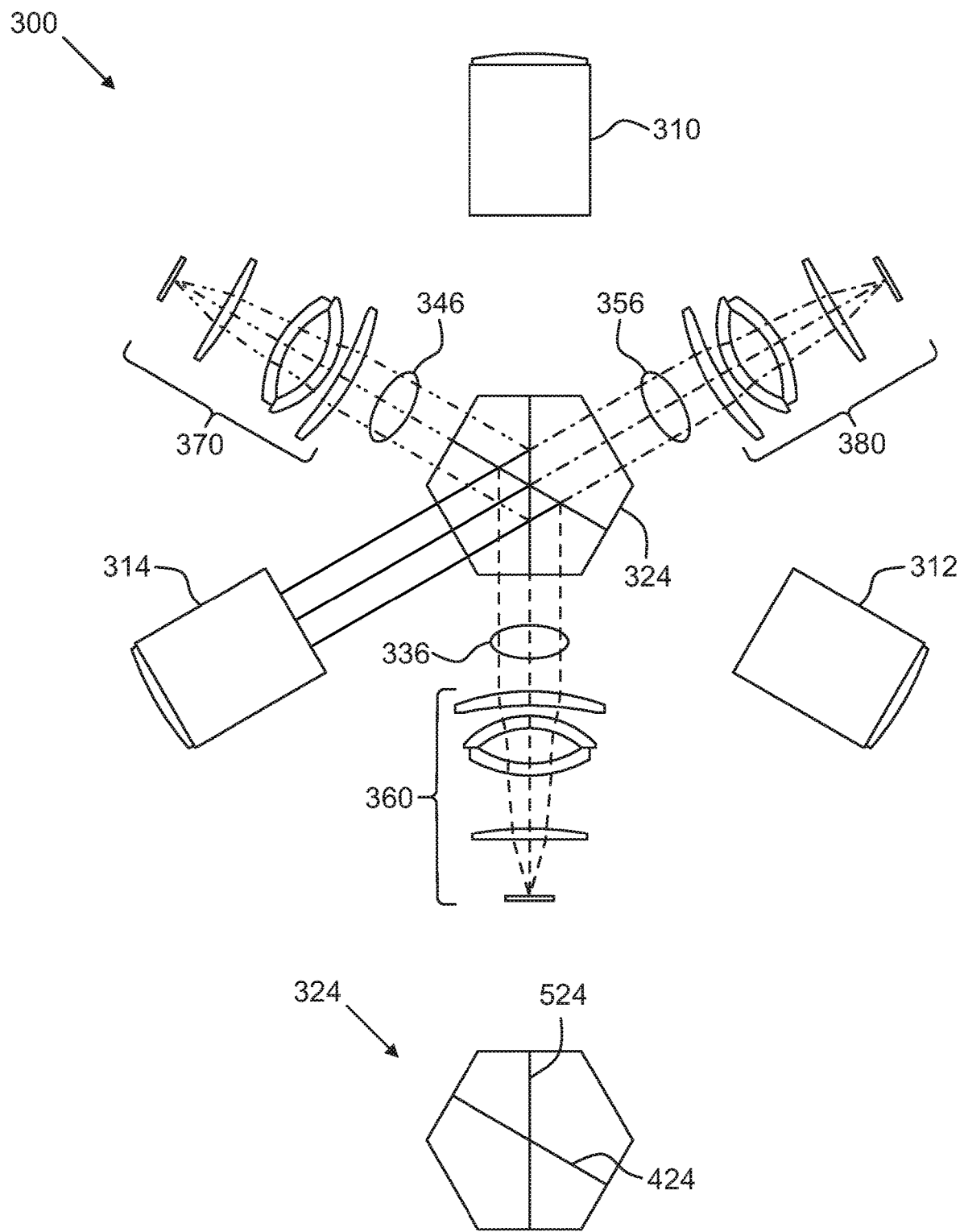

Referring to FIG. 4E, the second beam splitter 322 of FIG. 4D is capable of being moved out of the path of the first imager 310, the second imager 312, and the third imager 314 such that a third beam splitter 324 can be located substantially in place of second beam splitter 322, by means of, for example, translation, rotation, tilting, etc.

In one embodiment, light directed by the third imager 314 is incident upon the third beam splitter 324 which is capable of separating a first portion of light 336, a second portion of light 346, and a third portion of light 356 by means of, for example, transmitting the third portion of light 356, reflecting the first portion of light 336 in a first direction, and reflecting the second portion of light 346 in a second direction, as illustrated in the schematic view of FIG. 4E. The first portion of light 336 is incident on the first optical system 360, which is capable of substantially receiving the first portion of light 336. The second portion of light 346 is incident on the second optical system 370, which is capable of substantially receiving the second portion of light 346. The third portion of the light 356 is incident on the third optical system 380, which is capable of substantially receiving the third portion of light 356.

Referring again to FIG. 4E, similar to the description provided in reference to FIG. 4B and FIG. 4C, light directed by the first imager 310 and the second imager 312 are incident upon the third beam splitter 324, whereby the first portion of light of each is substantially directed away from the first optical system 360, the second portion of light of each is substantially directed away from the second optical system 370, and the third portion of light of each is substantially directed away from the third optical system 380. In this configuration, the first optical system 360, the second optical system 370, and the third optical system 380 substantially receive light directed from the third imager 314, and are substantially blocked from or do not substantially receive light directed by the first imager 310 and the second imager 312.

In one embodiment, the third beam splitter element 324 comprises a first optical band pass coating 424 and a second optical band pass coating 524, as illustrated in the same orientation in the lower portion of FIG. 4E. The first optical band pass coating 424 substantially reflects the first portion of light 336, substantially transmits the second portion of light 346, and substantially transmits the third portion of light 356. The second optical band pass coating 524 substantially transmits the first portion of light 336, substantially reflects the second portion of light 346, and substantially transmits the third portion of light 356.

Although embodiments of the present teachings having two and three imagers and optical systems are described in this disclosure, it is appreciated that any number of imagers and optical systems can be used in various other embodiments of the present teachings. The light splitting component can separate light by any number of methods, such as, but not limited to, wavelength, polarization, and division of aperture, while the optical systems can include systems such as, but not limited to, imaging, hyperspectral, and polarimetric sensors.

As used herein, the singular forms "a," "an," and "the" include the plural reference unless the context clearly dictates otherwise. Except where otherwise indicated, all numbers expressing quantities of ingredients, reaction conditions, and so forth used in the specification and claims are to be understood as being modified in all instances by the term "about."

For the purpose of better describing and defining the present invention, it is noted that terms of degree (e.g., "substantially," "about," and the like) may be used in the specification and/or in the claims. Such terms of degree are utilized herein to represent the inherent degree of uncertainty that may be attributed to any quantitative comparison, value, measurement, and/or other representation. The terms of degree may also be utilized herein to represent the degree by which a quantitative representation may vary (e.g., ±10%) from a stated reference without resulting in a change in the basic function of the subject matter at issue.

Although the present teachings have been described with respect to various embodiments, it should be realized a wide variety of further and other embodiments are possible within the spirit and scope of the appended claims.

What is claimed is:

1. An optical system, comprising:
a plurality of optical imaging subsystems configured to direct electromagnetic radiation;
a plurality of optical sub-systems optically disposed to receive the electromagnetic radiation from at least one optical imaging subsystem in said plurality of optical imaging subsystems;
a beam splitting device optically disposed at an optical path between said plurality of optical imaging subsystems and said plurality of optical sub-systems, wherein the beam splitting device is optically disposed to receive the electromagnetic radiation from at least one optical imaging subsystem in said plurality of the optical imaging subsystems and separate the received electromagnetic radiation into a plurality of portions, each portion in said plurality of portions of the received electromagnetic radiation being directed to at least one optical sub-system in said plurality of optical sub-systems;

wherein the beam splitting device comprises a first beam splitter and a second beam splitter, the first and second beam splitters being configured to be movable such that one of the first and second beam splitters replaces another one of the first and second beam splitters at the optical path between said plurality of optical imaging subsystems and said plurality of optical sub-systems in order to reconfigure the optical path;

wherein said optical system is configurable such that when said first beam splitter is located at the optical path between said plurality of optical imaging subsystems and said plurality of optical sub-systems, light from a first optical imaging subsystem in said plurality of optical imaging subsystems is substantially directed to at least one optical sub-system in said plurality of optical sub-systems, and light from at least one of remaining optical imaging subsystems in said plurality of optical imaging subsystems is substantially blocked from at least one optical sub-system in said plurality of optical sub-systems; and wherein said optical system is also configurable such that when said second beam splitter is located at the optical path between said plurality of optical imaging subsystems and said plurality of optical sub-systems, light from a second optical imaging subsystem in said plurality of optical imaging subsystems is substantially directed to at least one optical sub-system in said plurality of optical sub-systems, and light from at least one of the remaining optical imaging subsystems in said plurality of optical imaging subsystems is substantially blocked from at least one optical sub-system in said plurality of optical sub-systems.

2. An optical system, comprising:

a plurality of first optical subsystems configured to direct electromagnetic radiation;

a plurality of second optical subsystems configured to receive electromagnetic radiation;

a plurality of beam splitters, each beam splitter in said plurality of beam splitters being configured to be moveable such that each beam splitter in the plurality of beam splitters is capable of replacing another beam splitter in the plurality of beam splitters in order to reconfigure an optical path of said optical system;

wherein said optical system is configurable such that when each beam splitter in said plurality of beam splitters is optically disposed between said plurality of first optical subsystems and said plurality of second optical subsystems, electromagnetic radiation from a different optical subsystem in said plurality of first optical subsystems is substantially directed to said plurality of second optical subsystems, and electromagnetic radiation from at least one optical subsystem in remaining optical subsystems in said plurality of first optical subsystems is substantially blocked from at least one optical subsystem in said plurality of second optical subsystems.

* * * * *